Oct. 30, 1962 G. BECKER 3,061,184
CONTROL APPARATUS FOR CASH REGISTERS
AND OTHER BUSINESS MACHINES
Filed April 25, 1960 6 Sheets-Sheet 1

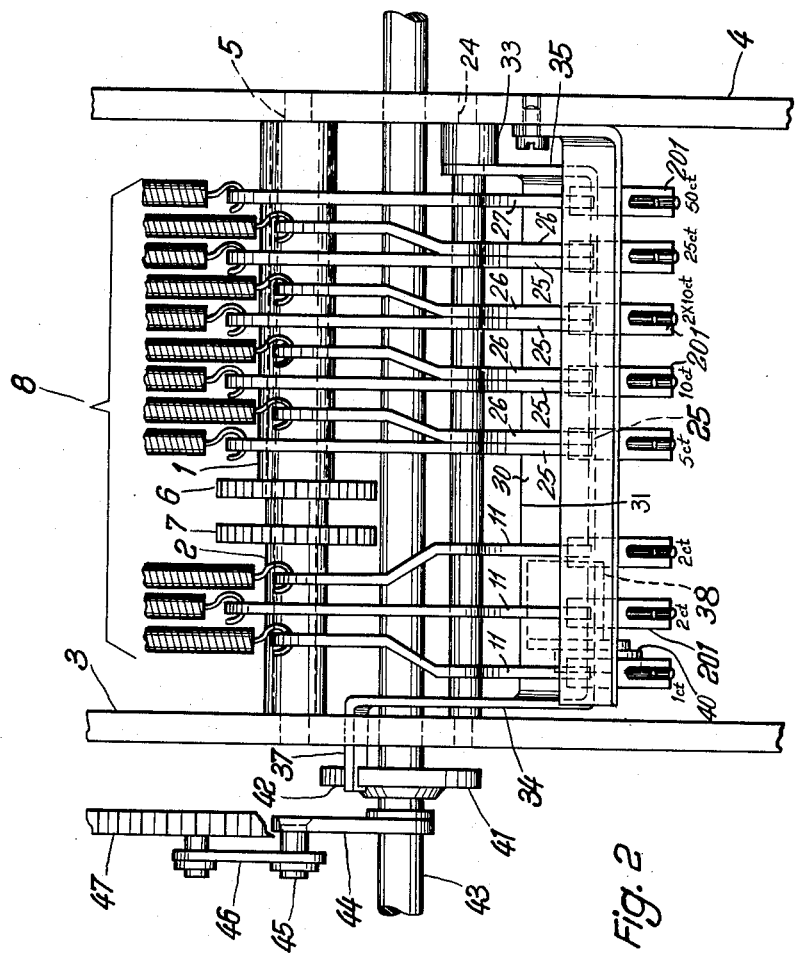

Oct. 30, 1962  G. BECKER  3,061,184
CONTROL APPARATUS FOR CASH REGISTERS
AND OTHER BUSINESS MACHINES
Filed April 25, 1960  6 Sheets-Sheet 3

Oct. 30, 1962  G. BECKER  3,061,184
CONTROL APPARATUS FOR CASH REGISTERS
AND OTHER BUSINESS MACHINES
Filed April 25, 1960  6 Sheets-Sheet 4
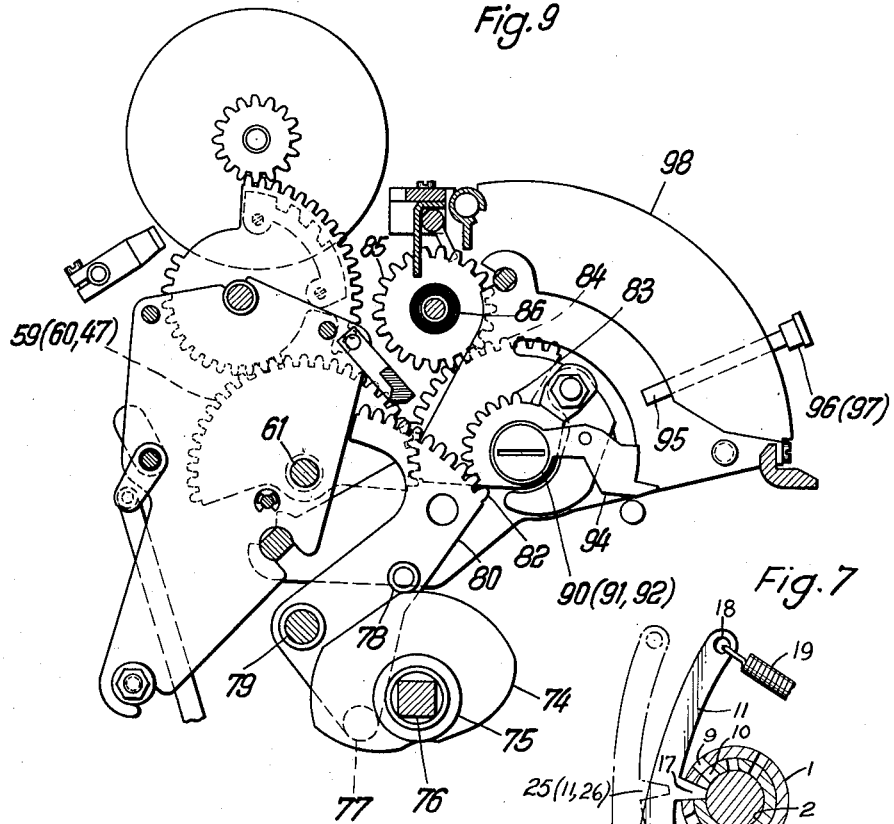
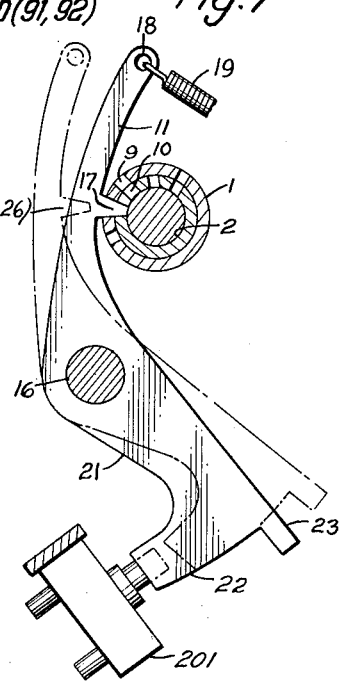
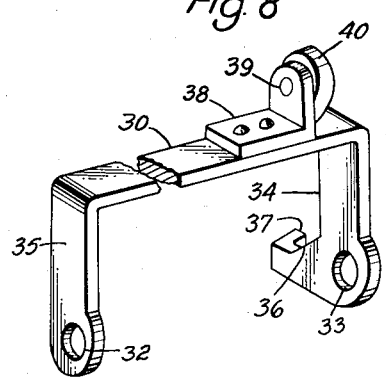

Oct. 30, 1962 G. BECKER 3,061,184
CONTROL APPARATUS FOR CASH REGISTERS
AND OTHER BUSINESS MACHINES
Filed April 25, 1960 6 Sheets-Sheet 6
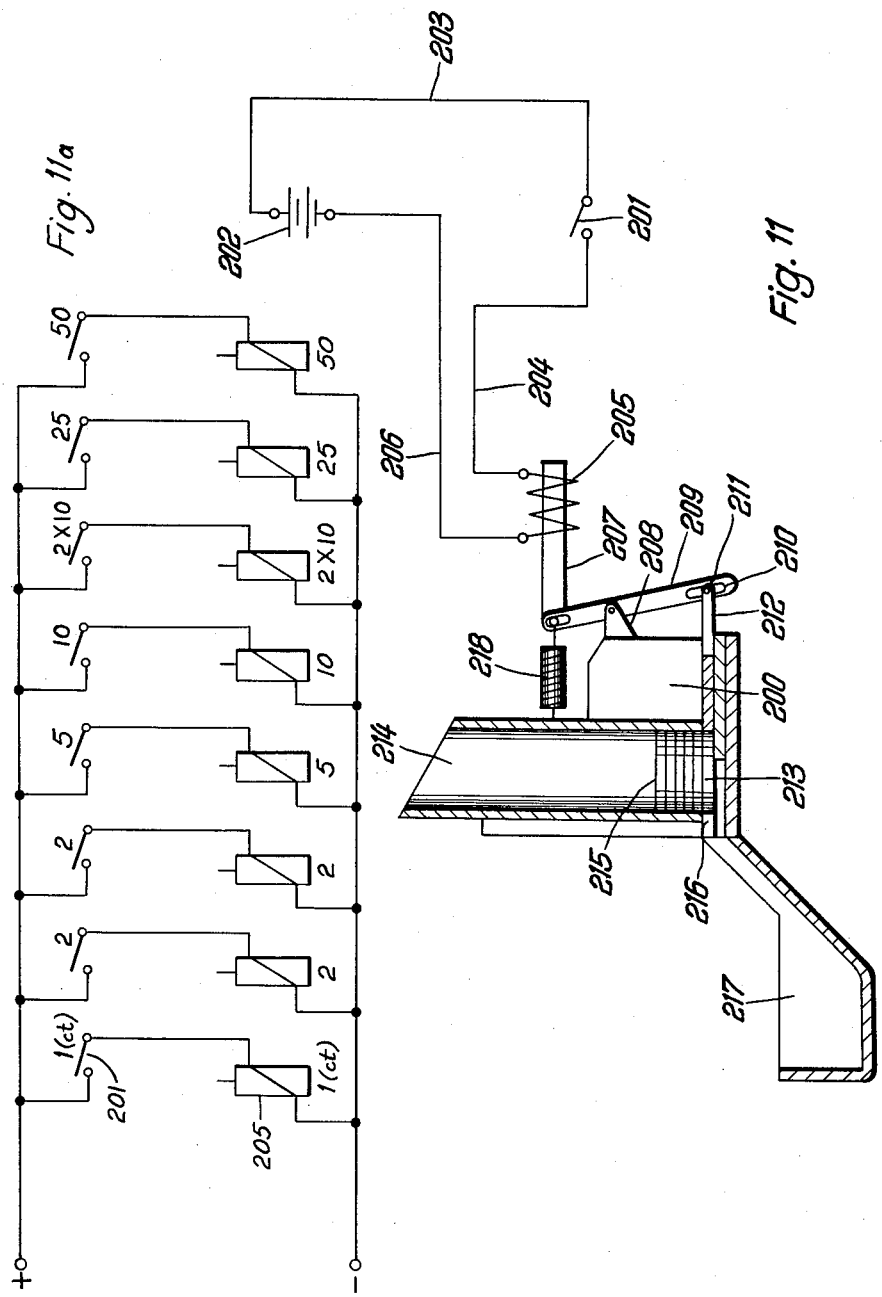

United States Patent Office 3,061,184
Patented Oct. 30, 1962

3,061,184
CONTROL APPARATUS FOR CASH REGISTERS AND OTHER BUSINESS MACHINES
Gerhard Becker, Bielefeld, Germany, assignor to Anker-Werke Aktiengesellschaft, Bielefeld, Germany, a corporation of Germany
Filed Apr. 25, 1960, Ser. No. 24,486
Claims priority, application Germany Apr. 24, 1959
12 Claims. (Cl. 235—7)

My invention relates to a control device for cash registers, accounting machines and similarly operating business machines.

Known control devices of this type are provided with control cams which, after being adjusted to a selected position by hand or mechanically, have their cam contour engaged by one or more feeler levers in the course of a subsequent machine run during which the feeler levers control certain machine functions such as the selection of adding mechanisms, the selection of item-counters, or a control of the particular type of operation, such as subtotalizing, totalizing, computation of change, to be performed. In some of these known devices, a plurality of control cams adjusted by respectively different control means, cooperate with a single feeler or cam follower for controlling a given machine performance. In other known devices, each of a plurality of separately adjustable control cams cooperates with its own cam follower to control or initiate a given performance.

It is an object of the invention to improve and simplify business-machine control devices of the above-mentioned type.

Another feature of the invention is to minimize the space requirements of such a control device by permitting the use of shafts that are anyhow required within a component subassembly of a business machine, for the conjoint purpose of effecting the selective control operation of the above-mentioned control device.

Still another object of the invention is to devise a control device that more readily permits a remote electrical control of business-machine subassemblies, such as coin-dispensing devices, installed separate from the cash register or other main machine proper.

To achieve these objects and in accordance with my invention, the control device in the business machine comprises a system of tubular shafts which are individually adjustable rotationally in dependence upon keyboard-controlled computing, printing or other mechanism units of the business machine, and are provided in their tubular surfaces with perforations or other openings arranged in a code pattern and engageable by a number of feeler members that, when in registry with certain openings, are permitted to move radially toward the shaft axis a greater extent than when no registry between feeler and openings exist, such radial feeler motion into the respective openings being utilized for causing the feelers to control the desired operation.

As will be more fully apparent below, such a business-machine control device according to the invention is universally applicable for various control functions occurring in connection with cash registers, accounting machines, and the like, and permits solving difficult control problems in a simpler manner than by the rather complicated electrical devices heretofore necessary for equivalent purposes.

A control device, operating with a system of perforated tubular shafts, as outlined above, has the further advantage that it requires a minimum of space even for performing complicated control operations. For example, structural elements in cash registers, accounting machines, and other business machines, such as the known tubular-shaft systems which, acting through spur-gear transmissions, drive the printing type wheels or other elements of the machine from the keyboard-controlled transfer mechanisms or computers, may simultaneously be employed as control members by providing the shafts of the system with the above-mentioned perforations or other openings that are to coact with feeler members for performing given control purposes.

Such a utilization of a tubular shaft system, not only for the above-mentioned driving purposes, but also for the control of predetermined functions, affords a considerable saving in material and cost, because additional control cams and appertaining driving and adjusting devices are thus eliminated.

According to another feature of the invention, the above-mentioned feeler members, coacting with the perforations of the tubular shaft system, are provided with electric contact switches that are actuated when the appertaining feeler is permitted to enter into one of the shaft perforations; and these contact switches are used for the remote control of subassemblies or accessory devices in dependence upon the operation of the cash register or other main machine.

The foregoing and more specific objects, advantages and features of our invention, said features being set forth with particularity in the claims annexed hereto, will be apparent from the embodiment of a cash register assembly illustrated by way of example on the accompanying drawings in which—

FIG. 2 is a rear view of the same control device, with appertaining feeler biasing springs shown turned away from the actual position into the plane of illustration.

FIG. 7 is a lateral view, corresponding to FIG. 1, of one of the feeler levers in the device.

FIG. 8 is a perspective view of a bracket member, also shown in FIGS. 1 and 2.

FIG. 9 is a lateral view of one of the key-controlled transfer mechanisms of the cash register for controlling the setting of the control device illustrated in the preceding figures.

FIG. 11 is a schematic and sectional view of part of the same coin dispenser and of an electric control circuit connecting the dispenser with the control device.

FIG. 11a is a schematic view of the electromagnetic control circuit for the coin dispensing system.

Figure 6:
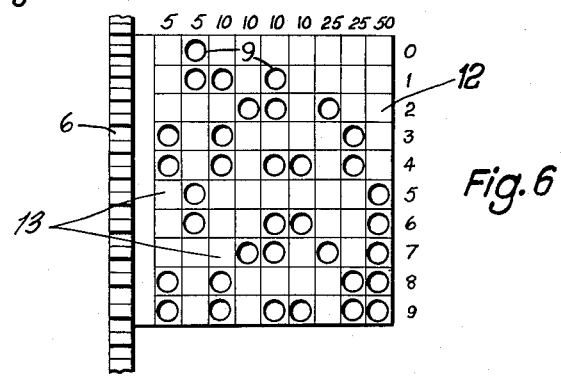
FIG. 6 is a planar development of its peripheral surface.
Figure 3:
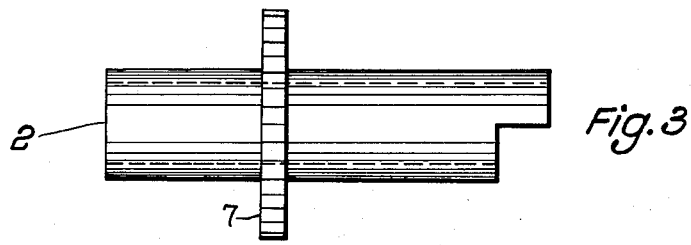
FIG. 3 is a front view of a tubular control shaft in the device of FIGS. 1 and 2.
Figure 4:
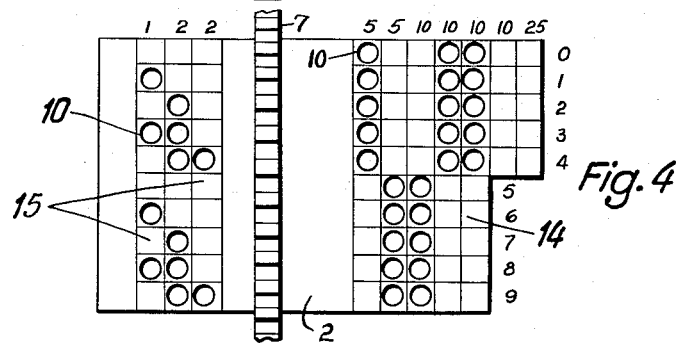
FIG. 4 is a planar development of its peripheral surface.

The illustrated embodiment of a control device according to the invention comprises two tubular shafts 1, 2 (FIGS. 1 to 6) revolvably mounted on a fixed shaft 5 which is fastened between stationary carrier plates 3, 4 (FIG. 2). A portion of the shaft 2 is located within the shaft 1. Each of shafts 1, 2 carries a rigidly fastened coaxial spur gear 6, 7 for adjusting the rotational position of the shaft. The control device further comprises a feeler assembly denoted as a whole by 8 (FIG. 2). For cooperation with the feeler assembly, the tubular shafts 1, 2 have their peripheral surfaces provided with perforations 9, 10 (FIGS. 3 to 6) located in a number of peripheral rows and forming together a code pattern in such a manner that in certain positions of the tubular shafts 1, 2 the nose 17 of a feeler lever 11, 25, 26 or 27 (FIGS. 1, 2, 7) can enter into one of the bores 9, 10 (FIGS. 4, 6) or into a pair of registering bores 9 and 10. In other rotational positions of the tubular shafts the nose 17 of the feeler abuts against a non-perforated peripheral surface portion 12, 13 or 14, 15 of the tubular shaft, thus limiting the radially inward feeler motion. There are as many feeler levers as there are rows of perforations. Each feeler lever (FIG. 7) has a bore 16 serving as a pivot bearing, and is provided with an eye 18 for a pull spring 19 (FIG. 1) whose other end is attached to a stationary tubular pin 20. Each feeler lever further has an arm 21 (FIG. 7) merging with a cam projection 22 and a stop lug 23. The bearing portion 16 of each feeler lever 11 is rotatably mounted on a shaft 24 (FIGS. 1, 2) which is common to all feeler levers and is fastened on and between the stationary carrier plates 3 and 4 (FIG. 2). The other feeler levers 25, 26 and 27 are all designed substantially in the same manner as the feeler lever 11 shown in FIG. 7, and are all biased by respective springs 19 for clockwise rotation relative to FIG. 1.

The feeler levers 11, 25, 26, 27 abut against a bracket 30 (FIGS. 1, 8) which is essentially of U-shaped configuration and has its two leg portions 34 and 35 provided with respective journalling bores 33 and 32. The leg portion 34 has an extension 36 with a laterally protruding lug 37. The lug 37 cooperates with a control cam 41 (FIGS. 1, 2) whose contour is interrupted by a notch 42 into which the lug 37 may drop. A cam disc 41 is fastened on a shaft 43 journalled in and between the side walls (not illustrated) of the cash register and extending through respective openings in the carrier plates 3 and 4. The shaft also carries a crank arm 44 (FIG. 2) whose crank pin 45 is engaged by a link 46 articulately joined with a spur gear segment 47 (FIG. 2).

An angle piece 38 is secured to the bracket 30 and carries a pivot pin 39 on which a roller 40 is rotatable. The roller 40 is engageable by an arm 48 (FIG. 1) of a lever 50 pivotally rotatable about a stationary pin 51. The lever 48 carries two rollers 53 and 54 engaging the contour of respective cams 55 and 56 which are mounted on the main shaft 76 (FIGS. 1, 9) of the cash register. The main shaft is driven by an electric motor (not illustrated) to perform a single full revolution for each machine run released by the control keys of the cash register, as is conventional with such business machines.

Figure 1:
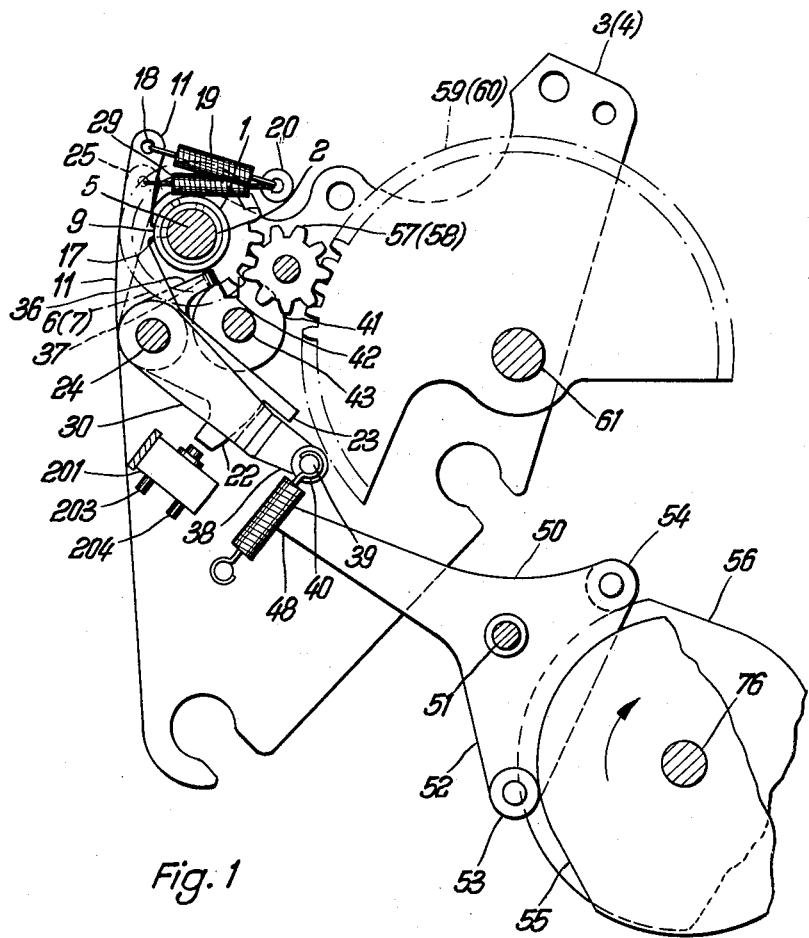
FIG. 1 is a lateral view of the control device according to the invention designed as a subassembly unit of a cash register.
Figure 5:
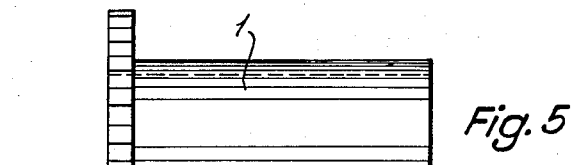
FIG. 5 is a front view of another tubular control shaft appertaining to the same device.

The spur gears 6, 7 (FIG. 1) on the respective tubular shafts 1, 2 mesh with respective intermediate spur gears 57, 58 which in turn are in meshing engagement with respective spur-gear segments 59, 60 (FIGS. 1, 9). The gear segment 59 is rotatably mounted on a shaft 61 (FIGS. 1, 9) and is driven from the machine main shaft 76 by cams 74, 75 which cooperate with cam-follower rollers 77, 78 journalled on a lever 80 pivoted about a shaft 79. The lever 80 is provided with a spur-gear segment 82 meshing with a gear segment 83 of a conventional transfer mechanism 90. This transfer mechanism 90 then transfers the value felt off, by means of the amount keys 96 of the amount-key bank, to the computing mechanism or other subassemblies of the machine such as the printing, indicating and check-issuing devices.

The gear segment 83 of the transfer mechanism is driven together with a gear segment 84 which meshes with a spur gear 85. Gear 85 is connected by an assembly of coaxial, tubular shafts 86 with the respective printing type wheels (not shown) of the cash register. The system of tubular shafts 86 for driving the printing wheels is not further illustrated and described herein because its details are not essential to the invention proper and are well known as such, for example from U.S. Patent 2,579,535.

The gear segment 60 and the above-mentioned gear segment 47 are driven in the same manner from the machine main shaft 76 under control by respective additional transfer mechanisms 91, 92 corresponding to the transfer mechanism 90 according to FIG. 9. At the commencement of a machine run, each transfer mechanism 90, 91 and 92 moves a feeler member 94 counterclockwise (FIG. 9) from a zero position until the feeler member 94 abuts against the shank 95 of the one key depressed in the bank of keys with which the particular transfer mechanism is associated. Shown in FIG. 9 is one of the keys 96 in bank 98 that are to be selectively depressed in accordance with an amount to be posted into the machine. Other key banks are provided with corresponding keys 97 (FIGS. 9, 10) for controlling a particular machine run as may be required for entering a posted amount into a selected adding mechanism, or for drawing a subtotal or total, registering an amount of refund, or indicating an amount of change due to the customer, as the case may be.

Depending upon the selected type of machine run, the transfer mechanisms 90, 91, 92 operate during the machine run, for example when performing a totalizing operation, to scan the individual digits from the adding mechanisms (not illustrated) and to transfer the respective values to the printing and indicating mechanisms of the cash register. It will be understood that the further details of the individual key-controlled transfer mechanisms and the respective operations performed thereby are conventional and not essential to the present invention proper. For suitable transfer mechanism and other cash-register mechanisms controlled thereby, reference may be had, for example, to U.S. Patent 2,057,438.

Figure 10:
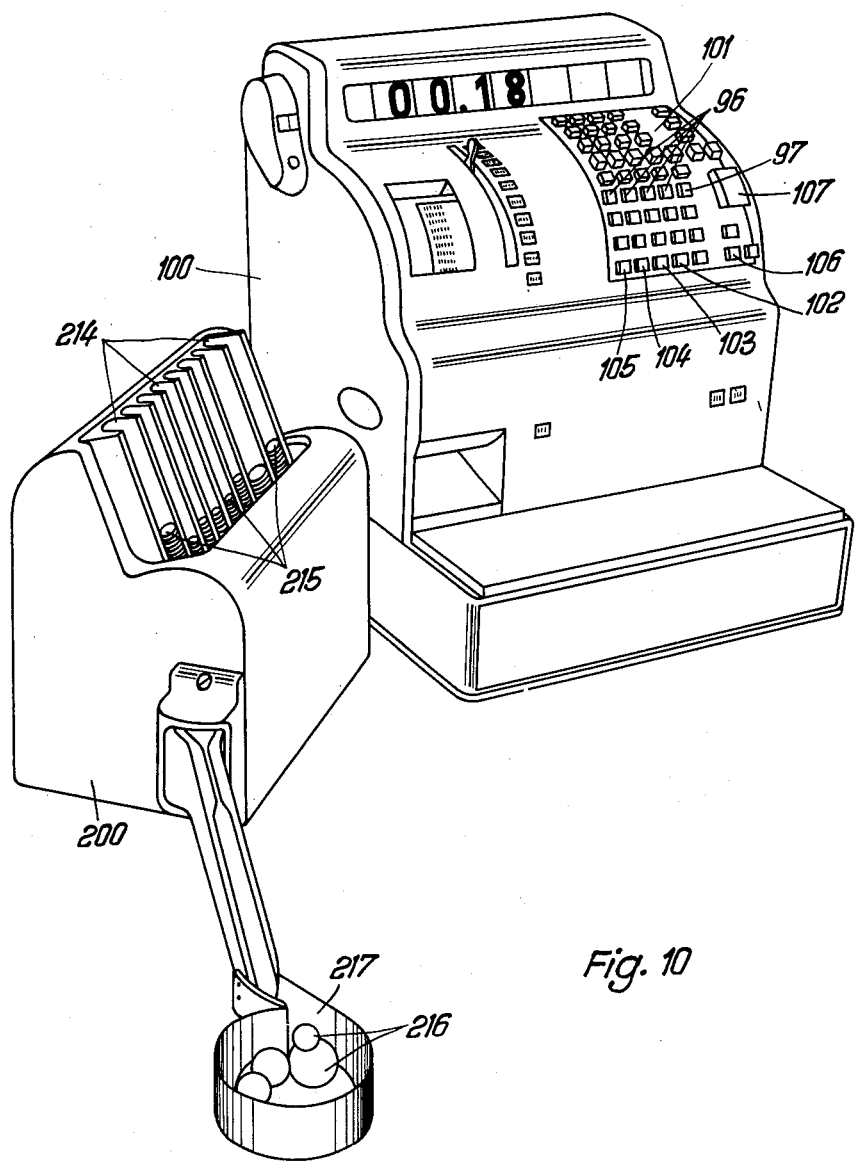
FIG. 10 is a perspective illustration of the cash register and of a coin dispenser operating under control by the control device according to the invention.

According to the embodiment illustrated in FIG. 10, the cash register 100, comprising the above-described control device (FIGS. 1 to 8) and a number of the above-described transfer mechanisms (FIG. 9), is used for the remote control of a coin dispenser 200 installed separate from the cash register. The control of the dispenser 200 is effected by a number of control members which, in the illustrated embodiment, consist of eight electric contact switches 201 (FIGS. 1, 2, 11). These switches 201 are acted upon by the feeler levers 11, 25, 26, 27 whenever these levers, while being moved inwardly toward the perforated tubular shafts, can enter into a shaft perforation. It will be understood, however, that, in lieu of electric switches, the control members to cooperate with the feelers may consist of mechanical transmission or coupling elements which, for example, mechanically select certain adding mechanisms, or item counters, or which perform some desired control function other than the dispensing of coins.

Aside from the devices already described, the cash register 100 (FIG. 10) possesses a keyboard 101 which comprises, in the conventional manner, a generally vertical row or bank of keys 102 for the posting of cent amounts, an adjacent bank of keys for the posting of ten-cent amounts, as well as additional key banks 104, 105 for the posting of dollar and ten-dollar values. The keyboard 101 further comprises a bank 106 of keys which are to be selectively depressed for controlling a particular machine run to be performed. The keys of bank 106, for example, comprise a "Sub-total" key, a "Grand-total" key, a "Refund" key, a "No-Sale" key, and a "Change" key, as generally known with cash registers. The "refund" key is to be depressed after the amount of refund is posted into the amount-key banks, when the cashier is to refund a certain amount to the customer, for example, for returned bottles. The "Change" key is available in some cash registers that comprise a computing mechanism for automatically indicating an amount of change to be paid back to the customer after he has tendered a money bill whose value, posted into the machine, is greater than the purchase price of the goods sold. Such a change-computing cash register is illustrated and described, for example, in the copending application Serial No. 635,713, filed January 23, 1957, for Change-Computing Apparatus in Business Machines, assigned to the assignee of the present invention. The keyboard 101 of the machine further comprises a bank 107 which permits selecting a particular adding mechanism in which the posted amounts of sales are to be accumulated, the keys of the latter bank being assigned for example to meat, grocery and other departments of a store.

Whenever an amount key or an adding-mechanism selector key is depressed by the cashier, the transfer mechanism of the appertaining bank becomes active in the above-described manner, and, in the embodiment here described, the tubular shafts 1, 2 of the control device according to FIGS. 1 to 8 are then automatically set for subsequent cooperation with the feeler levers which, when released to move toward the perforated control shafts, selectively actuate the above-mentioned contact switches 201.

Each contact switch 201 (FIGS. 1, 2, 11), when thus actuated, closes an electric circuit which connects a current source 202 by leads 203, 204, 206 with a solenoid coil 205. The movable solenoid core 207 is linked to a lever 209 pivoted on a bearing structure 208 mounted on the frame structure of the coin dispenser 200. The lever 209 has an elongated longitudinal slot 211 engaged by a pin 210 of a coin-dispensing slider 212. When coil 205 is energized, it causes the lever 209 to turn counter-clockwise, thus pushing the slider 212 against the lowermost coin 213 of a column of coins 215 stored in a tube 214. The coin 213 is thus ejected into a cup 217 from which it can readily be removed by the customer. When the circuit is thereafter opened by the switch 201, a spring 218 returns the lever 209 and slider 212 to the original position illustrated in FIG. 11.

Thus, the feeler levers 11, 25, 26, 27 are correlated to, and electrically connected with, the coin tubes 214 of the dispenser 200, so that the above-described feeler device permits controlling the dispenser to issue all necessary combinations of coins to make up the total amount posted into, or computed in, the cash register.

More in detail, the above-described dispensing operation takes place as follows.

In the illustrated embodiment, the spur gears 6 and 7, and hence the corresponding tubular control shafts 1 and 2, are correlated to the gear segments 59 and 60 which are driven from the respective transfer mechanisms 90 and 91 of the cent-unit key bank 102 and the ten-cent bank 103, or from the corresponding computing mechanisms of the cash register, depending upon the particular type of machine run selected by depression of one of the transaction control keys. When the tubular shafts 1 and 2 are thus adjusted, one bore 9 of the tubular shaft 1 may register with a given bore 10 of tubular shaft 2 in the travel path of a feeler nose 17. During the further machine run, the bracket 30 is released by the roller lever 50 and hence swings clockwise, relative to FIG. 1, under the force of the pull springs 19 acting on the feeler levers 11, 25, 26, 27.

This swinging motion of bracket 30, as already explained, depends upon the position of the control cam 41 into whose notch 42 the lug 37 of bracket 30 can enter when cam 41 has the proper rotational adjustment. Such adjustment of control cam 41 is effected by one of the control keys 87, namely the "Refund" key of the machine-run control bank 106. The transfer mechanism 92 of this key bank is in connection with the gear segment 47 which controls the cam disc 41 through link 46 and lever 44. Only if the control cam 41 as well as the bores 9, 10, of respective tubular shafts 1, 2 permit the described swinging motion of the bracket 30, will feeler levers rotate about their pivot shaft 24 so that one or more of them may close the respective contact switches 201. In this manner, one or a group of correlated circuits for coils 205 are energized, and each energized solenoid acts upon its lever 209 and slider 212 to eject a corresponding coin 213 from the coin-storage tube 214.

Before the machine run is terminated, the cam discs 55, 56 of the machine main shaft 76 turn the roller-carrying lever 50 clockwise (FIG. 1). The arm 48 of lever 50 then acts upon the roller 40 of the bracket 30 which returns the feeler levers 11, 25, 26, 27 to their starting position in which the switches 201 again open the respective electric control circuits.

For dispensing any amount from one cent to one dollar in coins, eight coin tubes 214 in the dispenser 200 are required, these tubes to be provided with coins of the following cent values: 1, 1, 1, 5, 10, 10, 25, 50. Eight rows of perforations in both tubular control shafts are required. It will be noted that the device according to FIG. 2 is shown equipped with a total of twelve feelers 11, 25, 26, 27 which cooperate with a total of twelve rows of perforations in the pair of control shafts 1, 2. However, each feeler 25 is joined with a feeler 26 to act upon a single switch 201 so that the noses of both feelers must simultaneouwsly pass through bores 9, 10 for actuating the switch. The first feeler 11 (counted from the left in FIG. 2) releases a single penny from the corresponding first coin tube. Each of the next two feelers 11 releases two pennies from the next two coin tubes. The four feeler pairs 25, 26 release a nickel, a dime, a dime, and a quarter respectively. The feeler 27 releases a half-dollar coin. Of course, the number and arrangement of the porforations or other openings in the tubular control shaft can be adapted to any other control purpose, and it will be understood that if more than eight control actions are involved in a desired control performance, the device can be readily enlarged to operate with the necessary greater number of feelers and rows of perforations.

While in the above-described example, the coin dispenser 200 is controlled in accordance with an amount posted into the machine by means of the amount keys and released by actuation of the "Refund" key, the same control device is analogously applicable for control of the dispenser 200 in response to an amount computed in the machine, as is the case when the machine is equipped with a change-computing mechanism released by actuation of the "Change" key, as more fully described in the above-mentioned copending application Serial No. 635,-713. In the latter case, the only difference resides in the fact that the tubular control shafts 1, 2 are adjusted by the change-computing mechanism rather than by an amount directly posted into the keyboard.

The illustrated control device described above with reference to FIGS. 1 to 7 has the advantage that it can be built as a unit which can be added to a cash register or other business machine of otherwise substantially conventional design, this being particularly of advantage if it is desired to have the same machine control a separately installed machine unit as exemplified by the coin dispenser 200. However, as mentioned above, a control device according to the invention can also be combined with a machine mechanism that heretofore served other functions only, thus greatly reducing the space requirements of the control components.

It is of particular advantage in this respect to assign to the tubular-shaft assembly 86 for driving the printing wheels of the machine through the spur gears 85 from the gear segments 84 of the transfer mechanisms 90, 91, 92, the same functions as performed by the above-described tubular control shafts 1 and 2. It is merely necessary to provide the individual tubular shafts of the assembly 86 with perforations or other openings corresponding to those denoted by 9 and 10 in FIGS. 4 and 6 for cooperation with feeler members of the same design and operation as described above with reference to the hollow shafts 1 and 2.

It will be obvious to those skilled in the art, upon study of this disclosure, that my invention permits of a variety of modifications and may be employed in various business machines for the performance of various controlling or selecting operations with the aid of electric or other con-

I claim:

1. In a cash register, accounting or other business machine having key-controlled mechanisms provided with respective members individually displaceable from a zero position to a selected one of a series of different value positions, the combination of a control apparatus comprising a group of tubular shafts arranged to rest telescopically within one another and geared to said respective members to be revolved thereby an angular amount corresponding to the displacement of said respective members from said zero position, each of said shafts having a peripheral tube wall and having in said wall a group of openings arranged in a plurality of peripheral rows; a number of feelers correlated to said respective rows, said feelers being distributed along said shafts and individually movable toward and away from said shaft and engageable with the openings in one of said respective rows depending upon the angular shaft position, so that the amount of feeler motion toward said shafts depends upon whether a particular feeler enters into one of said respective openings; control means for moving said feelers toward said shafts and into respective openings thereof; and a selectively operable device to be controlled having control members actuable by said respective feelers when said feelers enter into said openings, whereby said controlled device is actuated in dependence upon the combination of openings set by the relative positioning of said shafts.

2. In a business machine having key-controlled mechanisms provided with respective movable members individually displaceable from a zero position to a selected one of a series of different value positions, the combination of a control apparatus comprising a group of tubular shafts geared to said respective members to be revolved thereby an angular amount corresponding to the displacement of said respective members from said zero position, each of said shafts having a peripheral tube wall and having in said wall a group of openings arranged in a number of peripheral rows; a plurality of feelers correlated to said respective rows, said feelers being distributed along said shafts and being individually movable toward and away from said shaft and engageable with the openings in one of said respective rows depending upon the angular shaft position, so that the amount of feeler motion toward said shafts depends upon whether a particular feeler enters into one of said respective openings; control means for moving said feelers toward said shafts and into respective openings thereof; and a selectively operable device to be controlled having control members actuable by said respective feelers when said feelers enter into said openings, said tubular shafts having respective different diameters and being revolvable one within the other in coaxial relation thereto, said tubular shafts having rows of said respective groups of openings located in the same radial planes respectively so that openings of one shaft register with selected openings of the other shaft and are penetrable by one of said respective feelers when said shafts are in predetermined respective positions.

3. In a business machine having key-controlled mechanisms provided with respective movable members individually displaceable from a zero position to a selected one of a series of different value positions, the combination of a control apparatus comprising a group of tubular shafts geared to said respective members to be revolved thereby an angular amount corresponding to the displacement of said respective members from said zero position, each of said shafts having a peripheral tube wall and having in said wall a group of openings arranged in a number of peripheral rows; a plurality of feelers correlated to said respective rows, said feelers being distributed along said shafts and being individually movable toward and away from said shaft and engageable with the openings in one of said respective rows depending upon the angular shaft position, so that the amount of feeler motion toward said shafts depends upon whether a particular feeler enters into one of said respective openings; control means for moving said feelers toward said shafts and into respective openings thereof; and a selectively operable device to be controlled having control members actuable by said respective feelers when said feelers enter into said openings, said tubular shafts being coaxially aligned, and said feelers being pivotally movable and having a common pivot axis parallel to the axis common to said tubular shafts.

4. In a business machine having key-controlled mechanisms provided with respective movable members individually displaceable from a zero position to a selected one of a series of different value positions, the combination of a control apparatus comprising a group of tubular shafts geared to said respective members to be revolved thereby an angular amount corresponding to the displacement of said respective members from said zero position, each of said shafts having a peripheral tube wall and having in said wall a group of openings arranged in a number of peripheral rows; a plurality of feelers correlated to said respective rows, said feelers being distributed along said shafts and being individually movable toward and away from said shaft and engageable with the openings in one of said respective rows depending upon the angular shaft position, so that the amount of feeler motion toward said shafts depends upon whether a particular feeler enters into one of said respective openings; control means for moving said feelers toward said shafts and into respective openings thereof; and a selectively operable device to be controlled having control members actuable by said respective feelers when said feelers enter into said openings, said tubular shafts being coaxially aligned, a spur gear firmly mounted on each of said shafts in coaxial relation thereto and in geared connection with one of said respective movable members to be driven therefrom, each of said feelers having a feeler lever with a nose engageable with said openings, said feeler levers having a common pivot axis parallel to the axis of said tubular shafts.

5. In a business machine having key-controlled mechanisms provided with respective movable members individually displaceable from a zero position to a selected one of a series of different value positions, the combination of a control apparatus comprising a group of tubular shafts geared to said respective members to be revolved thereby an angular amount corresponding to the displacement of said respective members from said zero position, each of said shafts having a peripheral tube wall and having in said wall a group of openings arranged in a number of peripheral rows; a plurality of feelers correlated to said respective rows, said feelers being distributed along said shafts and being individually movable toward and away from said shaft and engageable with the openings in one of said respective rows depending upon the angular shaft position, so that the amount of feeler motion toward said shafts depends upon whether a particular feeler enters into one of said respective openings; control means for moving said feelers toward said shafts and into respective openings thereof; and a selectively operable device to be controlled having control members actuable by said respective feelers when said feelers enter into said openings, said control members comprising normally inactive electric control switches engageable by said respective feelers when said feelers enter into said openings of said tubular shafts.

6. In a business machine having key-controlled mechanisms provided with respective movable members individually displaceable from a zero position to a selected one of a series of different value positions, the combination of a control apparatus comprising a group of tubular shafts geared to said respective members to be revolved thereby an angular amount corresponding to the displacement of said respective members from said zero position, each of said shafts having a peripheral tube wall and having in said wall a group of openings arranged in a number of peripheral rows; a plurality of feelers correlated to said respective rows, said feelers being distributed along said shafts and being individually movable toward and away from said shaft and engageable with the openings in one of said respective rows depending upon the angular shaft position, so that the amount of feeler motion toward said shafts depends upon whether a particular feeler enters into one of said respective openings; control means for moving said feelers toward said shafts and into respective openings thereof; and a selectively operable device to be controlled having control members actuable by said respective feelers when said feelers enter into said openings, said tubular shafts being of different diameters and arranged to nest within one another, said device being located outside of, and separate from, the business machine and having respective magnets operable to dispense coins therefrom, said control members comprising electric control switches actuable by said respective feelers when said feelers enter into said openings of said tubular shafts, said switches being electrically connected with the respective magnets of said device for controlling them.

7. In a business machine having key-controlled mechanisms provided with respective movable members individually displaceable from a zero position to a selected one of a series of different value positions, the combination of a control apparatus comprising a group of tubular shafts geared to said respective members to be revolved thereby an angular amount corresponding to the displacement of said respective members from said zero position, each of said shafts having a peripheral tube wall and having in said wall a group of openings arranged in a number of peripheral rows; a plurality of feelers correlated to said respective rows, said feelers being distributed along said shafts and being individually movable toward and away from said shaft and engageable with the openings in one of said respective rows depending upon the angular shaft position, so that the amount of feeler motion toward said shafts depends upon whether a particular feeler enters into one of said respective openings; control means for moving said feelers toward said shafts and into respective openings thereof; and a selectively operable device to be controlled having control members actuable by said respective feelers when said feelers enter into said openings, said group of tubular shafts and said feelers with said control members having a common mounting structure so as to form a unit separable from the machine.

8. In a business machine having key-controlled mechanisms with respective gear members displaceable a key-controlled amount from a given position of rest, the combination of a control apparatus comprising a group of tubular shafts arranged to nest telescopically within one another and each carrying a spur gear, transmission means connecting said gear members with said respective spur gears whereby said tubular shafts are revolved an angular amount corresponding to the displacement of said respective gear members from said position of rest, each of said shafts having a peripheral tube wall and having in said wall a group of openings arranged in a number of peripheral rows; a number of feelers correlated to said respective rows, said feelers being distributed along said shafts and being individually movable toward and away from said shaft and engageable with the openings in one of said respective rows depending upon the angular shaft position, so that the amount of feeler motion toward said shafts depends upon whether a particular feeler enters into one of said respective openings; drive means engageable with said feelers for moving them toward said shafts to initiate a control operation; and a selectively operable device to be controlled having control members of which each is actuable by one of said respective feelers when said feeler enters into one of said openings, whereby said device is controlled in dependence upon the combination of openings set by the revolutions of said shafts.

9. In a business machine having key-controlled mechanisms provided with respective movable members individually displaceable from a zero position to a selected one of a series of different value positions, the combination of a control apparatus comprising a group of tubular shafts geared to said respective members to be revolved thereby an angular amount corresponding to the displacement of said respective members from said zero position, each of said shafts having a peripheral tube wall and having in said wall a group of openings arranged in a number of peripheral rows; a plurality of feelers correlated to said respective rows, said feelers being distributed along said shafts and being individually movable toward and away from said shaft and engageable with the openings in one of said respective rows depending upon the angular shaft position, so that the amount of feeeler motion toward said shafts depends upon whether a particular feeler enters into one of said respective openings; control means for moving said feelers toward said shafts and into respective openings thereof; and a selectively operable device to be controlled having control members actuable by said respective feelers when said feelers enter into said openings, said control means comprising a reciprocable member engageable with said feelers, a control cam, a follower engaging said cam and connected with said reciprocable member for reciprocating it to cause movement of said feelers toward said tubular shafts, and means selectively actuable for operating said cam.

10. In a business machine having key-controlled mechanisms provided with respective movable members individually displaceable from a zero position to a selected one of a series of different value positions, the combination of a control apparatus comprising a group of tubular shafts geared to said respective members to be revolved thereby an angular amount corresponding to the displacement of said respective members from said zero position, each of said shafts having a peripheral tube wall and having in said wall a group of openings arranged in a number of peripheral rows; a plurality of feelers correlated to said respective rows, said feelers being distributed along said shafts and being individually movable toward and away from said shaft and engageable with the openings in one of said respective rows depending upon the angular shaft position, so that the amount of feeeler motion toward said shafts depends upon whether a particular feeler enters into one of said respective openings; control means for moving said feelers toward said shafts and into respective openings thereof; and a selectively operable device to be controlled having control members actuable by said respective feelers when said feelers enter into said openings, said drive means comprising respective springs connected with said feelers for urging them toward said tubular shafts, a bracket pivotally mounted and engageable with said feelers for holding them away from said shafts, in opposition to the force of said springs, a latching member normally latching said bracket in a position where said feelers are kept away from said shafts, rotatable cam means releasable for a single-turn operation during each machine run and engageable with said latch member for temporarily releasing said bracket during each machine run, and an additional locking means engageable with said bracket and selectively controllable, whereby said bracket releases said feelers for control operation during a machine run only when said locking means is actuated.

11. In a business-machine control device according to claim 10, said cam means having a cam shaft forming part of the machine drive, and manually actuable key means connected with said locking means for controlling said locking means.

12. In a business-machine control device according to claim 11, said locking means comprising a rotatable cam member having a notch, and said bracket having a lug engageable with the cam contour of said latter member so as to enter into said notch for releasing said bracket when said rotatable locking member is set to a given rotary position.

References Cited in the file of this patent

UNITED STATES PATENTS

| | | |
|---|---|---|
| 1,279,053 | Werner | Sept. 17, 1918 |
| 1,912,992 | Mills | June 6, 1933 |
| 2,127,642 | Dieserud | Aug. 23, 1938 |
| 2,805,675 | Noyes | Sept. 10, 1959 |
| 2,972,442 | Goodbar et al. | Feb. 21, 1961 |